United States Patent [19]
Wadell

[11] Patent Number: 5,441,756
[45] Date of Patent: Aug. 15, 1995

[54] PROCESS FOR DISTRIBUTING OBJECTS

[75] Inventor: Lars G. A. Wadell, Aengelholm, Sweden

[73] Assignee: Nestec S.A., Vevey, Switzerland

[21] Appl. No.: 158,158

[22] Filed: Nov. 24, 1993

Related U.S. Application Data

[63] Continuation of Ser. No. 760,487, Sep. 16, 1991, abandoned.

[30] Foreign Application Priority Data

Sep. 17, 1990 [EP] European Pat. Off. ......... 90117854

[51] Int. Cl.⁶ .................................. A21D 13/08
[52] U.S. Cl. ................................ 426/556; 426/289; 99/450.1; 99/494; 221/200; 221/268
[58] Field of Search ............ 99/450.1, 450.2, 450.7, 99/494; 221/68, 200, 123, 131, 268, 270, 171, 172, 173, 264, 296; 198/442, 418.6, 418.1, 446; 426/289, 295, 556

[56] References Cited

U.S. PATENT DOCUMENTS

| | | | |
|---|---|---|---|
| 2,611,327 | 9/1952 | Rudolph . | |
| 2,679,309 | 5/1954 | Reading | 198/446 |
| 3,408,689 | 11/1968 | Heiner | 198/418.6 |
| 3,526,743 | 9/1970 | Spisak | 221/68 |
| 3,633,489 | 1/1972 | Spoelhof et al. | 99/450.7 |
| 4,101,284 | 7/1978 | Difiglio et al. | 221/264 |
| 4,150,751 | 4/1979 | Romagnoli | 209/682 |
| 4,167,091 | 9/1979 | Ruppert et al. | 221/296 |
| 4,733,520 | 3/1988 | Rabbi | 198/446 |
| 4,733,803 | 3/1988 | Sisson et al. | 221/264 |
| 4,962,699 | 10/1990 | Karlsson et al. | 221/200 |

FOREIGN PATENT DOCUMENTS

| | | |
|---|---|---|
| 280746A1 | 9/1988 | European Pat. Off. . |
| 2369904 | 6/1978 | France . |
| 0485507 | 3/1970 | Switzerland . |
| 1048827 | 11/1966 | United Kingdom . |

*Primary Examiner*—David A. Scherbel
*Assistant Examiner*—Reginald L. Alexander
*Attorney, Agent, or Firm*—Vogt & O'Donnell

[57] ABSTRACT

Spherical and quasi-spherical objects are fed from a vibratory feeder through at least one outfeed chute to an oscillable plate positioned beneath the chutes. The oscillable plate has pocket passages positioned therethrough so that upon oscillation of the plate in a first direction, a pocket passage aligns with each chute opening to receive an object. A second plate positioned beneath the first plate has at least one hole therethrough positioned so that each hole is offset from a position of each chute opening and so that upon oscillation of the first plate in the first direction to align each chute opening with a pocket passage, each object received in each pocket passage is retained and confined in the pocket passage by the second plate and so that after oscillation of the plate in a second direction so that each pocket passage is moved to a position away from and out of alignment with a chute opening, one hole is aligned with each pocket passage so that the objects pass from the pocket passages through the holes of the second plate.

2 Claims, 1 Drawing Sheet

PROCESS FOR DISTRIBUTING OBJECTS

CROSS REFERENCE TO RELATED APPLICATION

This application is a continuing application of application Ser. No. 07/760,487, filed Sep. 16, 1991, now abandoned.

BACKGROUND OF THE INVENTION

This invention relates to a distributor for spherical or quasi-spherical objects which is intended in particular for the application of cherries, pralines, nuts or other similar articles used to enhance the taste and appearance of, and/or to decorate, food products such as confectionery articles, biscuits or ice creams.

Of the known distributors for quasi-spherical objects, the most widely used are of the pneumatic or mechanical type. Pneumatic distributors comprise either means for randomly withdrawing one of the quasi-spherical objects by suction from a pile or, by contrast, means for pulsing said objects by means of compressed air from cavities into which they have previously been introduced and, in either case, for projecting said object onto the receiving products. Mechanical distributors which are very widely used include versions in which needles take up the objects to be placed on the receiving product from a reserve and subsequently transfer them from this reserve to the product and deposit them thereon.

These known distributors, whether of one type or the other, are attended by the disadvantage of generally poor reliability in operation. For instance, it is usually desirable that only one nut is applied to a cake, but many known distributors are unable to ensure this and often apply more than one nut. In addition, mechanical distributors equipped with needles involve a real danger, so far as the food products are concerned, in that needles or fragments of needles can break or become detached and remain in the product without any possibility of detection at the moment the incident occurs, making the end product particularly dangerous to eat. In view of these disadvantages, distribution is still generally done by hand but this involves considerable labour costs.

SUMMARY OF THE INVENTION

The present invention obviates the afore-noted disadvantages by providing an apparatus and method for distributing quasi-spherical objects such as cherries, nuts or pralines, preferably not sticky, capable of applying them to food products one at a time.

The present invention provides for an apparatus for distributing spherical and quasi-spherical objects onto a food product comprising a vibratory feeder having one or more outfeed chutes, one or more vertical transport tubes positioned below and offset laterally from the outfeed chutes, an oscillable plate which provides a sliding device having one or more pocket openings therethrough adapted to align alternately with the ends of the outfeed chutes and the upper openings of the transport tubes, and a fixed plate which is positioned between the oscillating sliding device and the transport tubes and which is provided with one or more holes positioned directly above the upper openings of the transport tubes. Means are provided for applying the objects provided by transport tubes onto the food product.

A process according to the present invention comprises vibrating the vibratory feeder containing the objects and feeding the objects to a plurality of chutes, transporting the objects through the chutes, dispensing the objects vertically downwardly from openings in the chutes and oscillating the oscillable plate horizontally (a) in a first direction relative to the chutes and to the top surface of the fixed plate and aligning the pocket openings with the chute openings in a one to one relationship and with a solid portion of the top surface of the second plate, receiving the objects from the chute openings in the pockets of the oscillable plate, which provide passages for the objects, and containing the objects in the pocket passages and then, (b) in a second direction away from the chute openings and aligning the pockets with the holes in the second plate to pass the objects from the pocket passages through the second plate holes, and then the objects are conveyed from the second plate holes to a food product for application to the food product.

A vibratory feeder is a conventional device available commercially consisting of a hopper in the form of a hollow cylinder with narrow spiral lanes around the wall and terminating in one or more usually horizontal outfeed chutes at the upper end. During the vibrating which is usually carried out magnetically, the quasi-spherical objects travel along the lanes to the outfeed chutes. In the present invention, there are preferably from 3 to 5 outfeed chutes depending upon the product size and the feeder diameter. The size of the cylinder and the width of the lanes may vary according to the size of the quasi-spherical objects. The quasi-spherical objects are preferably size graded before feeding into the vibratory feeder.

In the apparatus of the present invention, the sliding device is oscillable so that in one direction of oscillation, one opening in a pocket comes into alignment with the end of an outfeed chute and so that in the opposite direction of oscillation, the other opening in a pocket comes into alignment with the upper opening of a transport tube. When there is more than one outfeed chute, the ends are spaced from one another and preferably, the number of transport tubes is equal to the number of outfeed chutes. When there are a plurality of transport tubes and outfeed chutes, the upper openings of the transport tubes are preferably positioned opposite the spaces between the outfeed chutes.

The means for applying the quasi-spherical objects onto the food product may advantageously be an applying head such as described in European Patent Application No. 0280746.

The present invention also provides a process for distributing quasi-spherical objects onto a food product which comprises feeding the quasi-spherical objects to a vibratory feeder having a one or more outfeed chutes, causing the vibratory feeder to vibrate so that the quasi-spherical objects travel along the outfeed chutes, oscillating a plate which provides a sliding device positioned between the ends of the outfeed chutes and one or more transport tubes positioned below and offset laterally from the outfeed chutes, the sliding device being formed with one or more pockets with openings adapted to align alternately with the ends of the outfeed chutes and the upper openings of the transport tubes so that at each oscillation, one quasi-spherical object passes from the end of an outfeed chute into a pocket and then, via a hole in a fixed plate positioned between the oscillating sliding device and the transport tubes, to a transport tube from where it is applied to the food product.

The present invention is further illustrated by way of example only with reference to the accompanying drawings.

Figure 1:
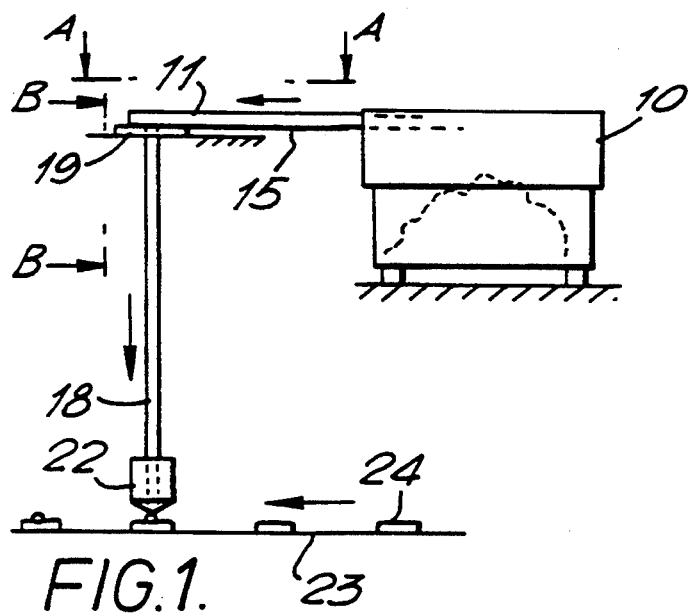
FIG. 1 represents a diagrammatic side view of an apparatus according to the invention.
Figure 3:
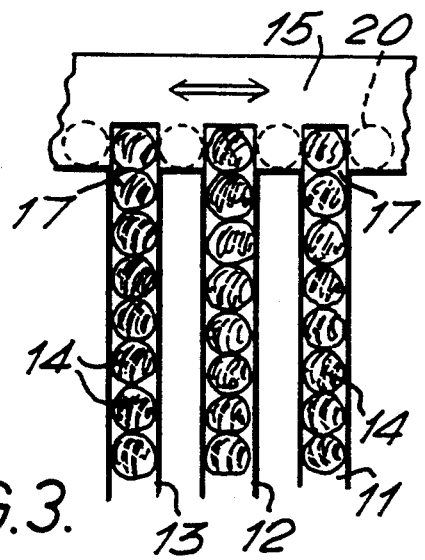
FIG. 3 represents a view of FIG. 1 looking in the direction of the arrows A—A.
Figure 2:
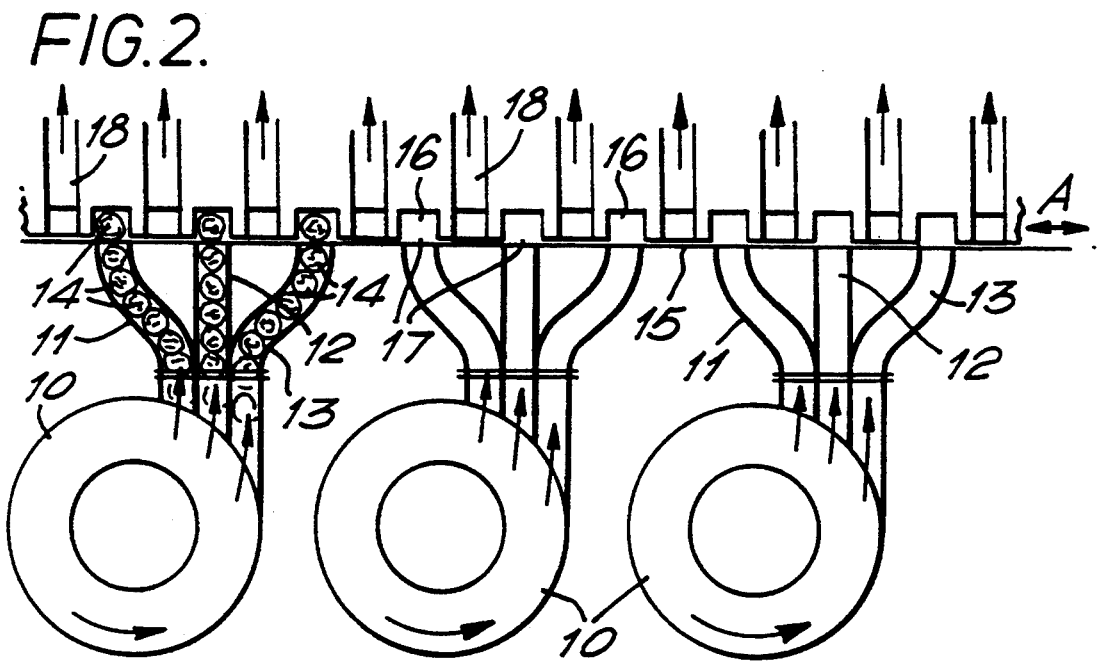
FIG. 2 represents a diagrammatic top view of the same apparatus.
Figure 4:
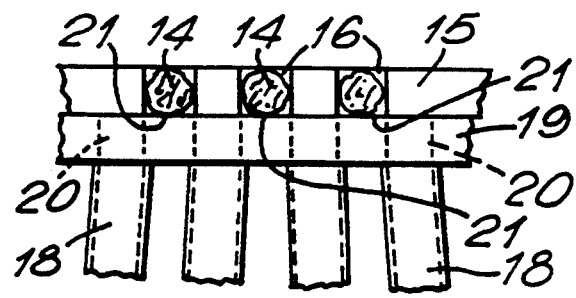
FIG. 4 represents a view of FIG. 1 looking in the direction of the arrows B—B.

Referring to the drawings, the apparatus comprises a vibratory feeder 10 having a diameter of from 250 to 450 mm with three spaced outfeed chutes 11, 12 and 13 along which travel nuts 14. Positioned perpendicular to the upper ends of the transport tubes is a plastic sliding device 15 having square pockets 16, each with a first opening 17 shown opposite the ends of the outfeed chutes 11, 12, 13 in FIG. 2. Positioned below the sliding device are vertical transport tubes 18, and between the sliding device and transport tubes is a fixed plate 19 with holes 20 positioned directly above the upper openings of the transport tubes 18. A second opening 21, in each square pocket 16, is shown facing the fixed plate 19 in FIG. 4. An applying head 22 is positioned above a belt 23 conveying biscuits 24.

In operation, the nuts 14 are size graded and filled into the vibratory feeder 10, the vibration of which causes the nuts to travel along the outfeed chutes 11, 12 and 13 to enter the pockets 16 at the opening 17. The sliding device 15 oscillates in the direction of the arrow A in FIG. 2, firstly to the left so that the pockets each containing one nut move to a position above the transport tubes 18, where the second opening 21 of each pocket comes into alignment with the upper opening of each transport tube, whereupon one nut passes through the second opening 21 of each pocket 16, then through a hole 20 in the fixed plate 19 and finally enters a transport tube 18. In this position, the solid parts of the sliding device between the pockets are situated opposite the ends of the outfeed chutes and effectively form a closure to prevent any nuts from leaving the ends of the outfeed chutes. The sliding device then oscillates in the reverse direction so that the pockets are once again opposite the ends of the outfeed chutes where one nut enters each pocket and the process is repeated.

The nuts in the transport tubes 18 are then fed one at a time by means of an applying head 22 to biscuits 24 travelling on the conveyor belt 23, and the whole apparatus is synchronised to ensure that only one nut is embedded in each biscuit.

As will be appreciated from the foregoing and from the drawing Figures, the first plate sliding device 15 is positioned to have a horizontally extending top surface positioned beneath each chute opening and is oscillable horizontally. The pocket passages 16 pass through the first plate 15 from the top surface to a bottom horizontally extending plate surface. The plate has a top to bottom surface thickness sufficient and each pocket passage has a size sufficient for containing one object within the pocket passage. Each pocket passage is positioned so that upon oscillation in a first direction, one pocket passage aligns with each chute opening to receive an object. The second plate 19 has a horizontally extending top surface positioned beneath and adjacent the first plate bottom surface and has at least one hole which passes therethrough from the top surface to a bottom surface having a size sufficient for the objects to pass through. The second plate and its holes are positioned so that each hole is offset horizontally from a position of a chute opening and so that upon oscillation of the first plate in the first direction to align each chute opening with a pocket passage, the second plate retains each object received in each pocket passage and so that after upon oscillation of the first plate in a second direction so that each pocket passage is moved to a position away from and out of alignment with a chute opening, one hole is aligned with each pocket passage so that each object passes from each pocket passage through an aligned hole of the second plate. The articles then are conveyed to a food product.

I claim:

1. A process for distributing articles onto a food product comprising:

vibrating a vibratory feeder and feeding articles selected from the group consisting of spherical and quasi-spherical objects to a plurality of chutes connected thereto wherein each chute extends to one object-dispensing opening disposed for dispensing the objects vertically downwardly and transporting the objects through the chutes to the chute openings and dispensing the objects from the openings;

horizontally oscillating a first plate, which is positioned beneath the chute openings, which has a top surface positioned adjacent the chute openings, which has pocket passage openings which have a size sufficient for passing the objects therethrough and for containing one object therein and which is positioned above a top surface of a second plate having holes having a size sufficient for passing the objects therethrough, (a) in a first direction relative to the chutes and to the top surface of the second plate and aligning the pocket passages with the chute openings in a one to one relationship and with a solid portion of the top surface of the second plate, receiving the objects from the chute openings and containing the objects in the passages and then, (b) in a second direction away from the chute openings and aligning the pocket passages with the holes in the second plate to pass the objects from the pocket passages through the second plate holes; and conveying the objects from the second plate holes to a food product for application to the food product.

2. A process according to claim 1 wherein the objects are transported through the chutes horizontally.

* * * * *